United States Patent [19]

Mailloux

[11] Patent Number: 5,410,615
[45] Date of Patent: Apr. 25, 1995

[54] BITMAP IMAGE RESOLUTION CONVERTER COMPENSATING FOR WRITE-WHITE XEROGRAPHIC LASER PRINTING

[75] Inventor: Louis D. Mailloux, Fairport, N.Y.

[73] Assignee: Xerox Corporation, Stamford, Conn.

[21] Appl. No.: 588,125

[22] Filed: Sep. 25, 1990

[51] Int. Cl.$^6$ .............................................. G06K 9/42
[52] U.S. Cl. ..................................... 382/47; 358/451
[58] Field of Search ................... 382/47, 54; 358/451, 358/447, 428

[56] References Cited

U.S. PATENT DOCUMENTS

| | | | |
|---|---|---|---|
| 3,096,398 | 7/1963 | Gabor et al. | 178/6.8 |
| 4,508,463 | 4/1985 | Wang et al. | 400/124 |
| 4,528,693 | 7/1985 | Pearson et al. | 382/47 |
| 4,569,081 | 2/1986 | Mintzer et al. | 382/47 |
| 4,630,947 | 12/1986 | Yoshida et al. | 358/451 |
| 4,632,579 | 12/1986 | Takano et al. | 400/121 |
| 4,679,039 | 7/1987 | Neil et al. | 340/728 |
| 4,698,778 | 10/1987 | Ito et al. | 358/451 |
| 4,827,352 | 5/1989 | Yoneda et al. | 358/287 |
| 4,829,587 | 5/1989 | Glazer et al. | 382/47 |
| 4,841,375 | 6/1989 | Nakajima et al. | 353/280 |
| 4,872,064 | 10/1989 | Tutt et al. | 382/47 |
| 4,907,152 | 3/1990 | Lempriere | 382/47 |

*Primary Examiner*—Yon J. Couso

[57] ABSTRACT

The present invention is a method to enable the conversion of binary image data originally generated at a lower resolution into representative binary image data of a higher resolution, wherein the conversion ratio, or magnification factor, is an integer value. Included within the resolution conversion method is compensation for the conversion of an image optimized for write black printing system to a write white printing system.

2 Claims, 5 Drawing Sheets

BITMAP IMAGE RESOLUTION CONVERTER COMPENSATING FOR WRITE-WHITE XEROGRAPHIC LASER PRINTING

This invention relates generally to a system for converting bit map images from a first resolution to a second resolution, particularly where the second resolution will be printed using a line thinning printer technology.

CROSS REFERENCE AND INCORPORATION BY REFERENCE

Cross reference is hereby made to U.S. patent application Ser. No. 07/513,415 now U.S. Pat. No. 5,282,057 entitled "Bit-map Image Resolution Converter", by Mailloux et al. The above-identified application is herein incorporated by reference for its teachings

BACKGROUND OF THE INVENTION

It is a generally known requirement of certain computer graphic output devices to convert the resolution of digital input images prior to outputting them at a predefined output resolution (pixel density or raster density). Specifically, printer systems capable of printing image data and/or character data have become widely used. Furthermore, printer systems of this type currently provide high resolution 600 spots per inch (spi) output capabilities which, in many cases, is higher than the input resolution available. This results in a situation where the performance of the printer may not be used to the maximum. For example, many existing input scanners and personal computer software packages operate at a medium image resolution of 300 spi, resulting in either an incompatibility with higher resolution printers or underutilization of the output capabilities of the high resolution printers.

For these reasons, current technology is focused upon means for conversion of image data of one resolution to an image of a second resolution. It is a commonly known practice to implement this type of conversion through simple pixel and raster level operations, such as pixel doubling. Alternatively, more elaborate methods have been developed to facilitate this type of conversion, some of which are described below.

A particular problem arises in the resolution conversion of bit map images, where the images have been previously optimized for a specific printing technology. Thus, for example, images may be optimized for write-black printer technology, which tends to thicken lines, and subsequently transmitted to a write-white printer, which tends to thin lines. Such images will appear undesirably lighter. Single pixel lines will tend to be invisible. Another effect that might be present in an optimized image might be halfbitting, which may not be required in a higher resolution image U.S. Pat. No. 3,096,398 to Gabor et al. discloses a method of supplementing the information received from a television broadcast system. The method of supplementation used involves interpolation between parts of the transmitted information to produce supplementary approximations of non-transmitted portions of a picture. A novel method of interpolation, contour interpolation, is taught wherein an apparatus is used to sense contours within selected picture portions and the interpolation to produce approximations to unselected picture portions is carried out both with regard to the position of such contours in the selected picture portions actually communicated and to their amplitudes.

U.S. Pat. No. 4,508,463 to Wang et al. teaches a technique and apparatus used with a dot matrix printer to provide high print resolution while printing at relatively high speeds. The higher print resolution is achieved through the use of a bi-directional printing mechanism including a method of offsetting the pin locations of the first printing pass with respect to corresponding pin locations in a pass of opposite direction. Furthermore, the technique taught includes a means of compact character encoding to reduce memory requirements within the printer system.

U.S. Pat. No. 4,632,579 to Takano et al. discloses a method of increasing print resolution by mechanically altering the relative position of the print head with respect to the paper during subsequent printing passes to increase the output resolution of the printer. Also disclosed is a means for controlling the activation of printing pins using a microprocessor based interpolation scheme to synthesize a secondary dot matrix pattern based upon a primary dot matrix pattern contained in memory for the associated character or pattern.

U.S. Pat. No. 4,679,039 to Nell et al. teaches a method for smoothing the display of contiguous parallel line segments in a manner to reduce the discontinuities that occur near the ends of the line segments. Smoothing is achieved by adding auxiliary dots of a lesser diameter below the larger main dots forming a first line segment in a given row and adding the same size auxiliary dots above the main dots of an adjacent line segment when the latter are in a row below the given row. The smoothing operation is optimized for multiple cases and line orientations and more than three different dot sizes can be used in the smoothing operation.

The above patents disclose methods of increasing the apparent resolution of an output device through a manipulation of the output device according to a predefined algorithm based on interpolation of adjacent image information. While these techniques are useful for the older technology printing and display devices, they are limited in application to the higher resolution output devices found in current computer graphics environments. Furthermore, the patents cited do not teach any methods for altering the interpolated output data to achieve a more desirable visual appearance.

U.S. Pat. No. 4,827,352 to Yoneda et al. discloses an image processing apparatus comprising a means for receiving a continuous-tone input image and converting the input into a binary image through the use of a dither matrix. Subsequently, the binary image is converted to an alternate pixel-density based upon a window whose size is related to the original dither matrix. The conversion is accomplished using a processing means to analyze a window of the first binary image to determine an average image density within the window and subsequently applying a second dither matrix, to generate a binary image at an alternate resolution.

U.S. Pat. No. 4,841,375 to Nakajima et al. teaches an image resolution conversion apparatus for converting the pixel density of image data, comprising an input means for receiving image data, a selection means to determine the appropriate pixel-density conversion ration, and a pixel-density converting means. The pixel-density converting means comprises, inter alia, a conversion-pixel density operating means for calculating a conversion-pixel density based on the input pixel data and a binary encoding means for subsequently applying a threshold to the conversion-pixel density value and generating a conversion-pixel binary output. Also disclosed is a threshold-value setting means which dynamically adjusts the threshold value to be applied within the binary encoding means on the basis pattern detection applied to the original or reference image data.

The Yoneda and Nakajima patents above deal with the current output printing technology and the requirements for a means to convert images to alternate resolutions. Specifically, both define methods of converting resolutions of previously binary encoded images using a means for determining an estimated grey density for a region of the binary image. Subsequently, the grey density is used as an input to a binary encoder, either a dither matrix or thresholding function, thereby generating a converted output image. The Nakajima patent further discloses a means for altering the threshold over a local region, to alter the characteristics of the converted image.

The Yoneda and Nakajima patents, utilize methods that approximate a grey density for a target area and subsequently encode the data to a converted binary format, potentially masking single pixels or adding structure to the converted image.

SUMMARY OF THE INVENTION

In accordance with the invention, there is provided a method for the conversion of binary image data originally generated at a lower resolution, optimized for a particular printer technology, into representative binary image data at an integer-multiple higher resolution. Included within the resolution conversion algorithm are methods to correct the output for reproduction on a printer having different reproduction characteristics.

In accordance with one aspect of the invention, there is provided a resolution conversion method which in the process of conversion of binary image data originally generated at a lower resolution and optimized for a particular printer technology, into representative binary image data at an integer-multiple higher resolution, provides an amount of line thickening, or dilation correcting the bitmap for reproduction in a printer having line thinning characteristics. The dilation function may be performed by the application of state rules to the magnification process which tend to favor line thickening. The rules may by asymmetric about a magnified pixel.

Other objects and advantages will become apparent from the following description taken together with the drawings in which.

As used herein, write-black refers to an electrophotographic printing process in which the portions of the image that will attract black toner for eventual transfer to a copy substrate are discharged with an exposure device, such as a laser. By contrast, write-white refers to an electrophotographic printing process in which the portions of the image that will not receive toner are discharged with an exposure device. While the invention is defined in terms of two types of laser printers, it will no doubt be appreciated that other printing processes are well within the scope of the invention, where a first process might print a bitmap, optimized for printing in a second process, in a manner somewhat differently than the second process.

Figure 1:
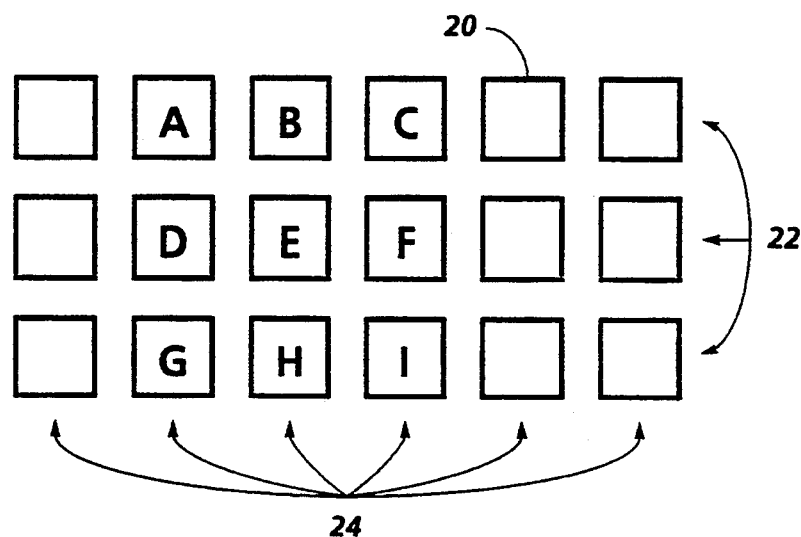
FIG. 1 is an illustration of a representative portion of an input raster image.

Referring now to the drawings where the showings are for the purpose of illustrating a preferred embodiment of the invention, and not for limiting same, FIG. 1 shows a representative segment of video data. Specifically, the segment consists of a plurality of binary image pixel positions 20, generally arranged horizontally into rows or scanlines 22. In addition, pixels 20 are arranged vertically into columns of pixels 24 so as to form an addressable matrix of image pixels 20. Hereinafter, all references to the binary state of an image pixel are intended to imply a white or black condition of the pixel.

In accordance with the present invention, the magnification, or equivalently, the resolution conversion, of the image is implemented in a pixel by pixel fashion based upon neighboring image pixels. With reference to the 3 scanline by 3 pixel (3×3) array of original image pixels in FIG. 1, denoted alphabetically as pixels A through I, a center pixel E may be magnified by an integral multiple based upon the relative binary states of neighboring pixels A, B, C, D, F, G, H and I. The default binary state for the output pixel is determined by the binary state of the center pixel. Alteration of the default state is based upon the binary states of neighboring pixels and the relationships between sub-groups of neighboring pixels. Definition of the 3×3 original image array allows the generation of specific rules which may be applied symmetrically to all pixels to be generated from center pixel E.

Figure 2:
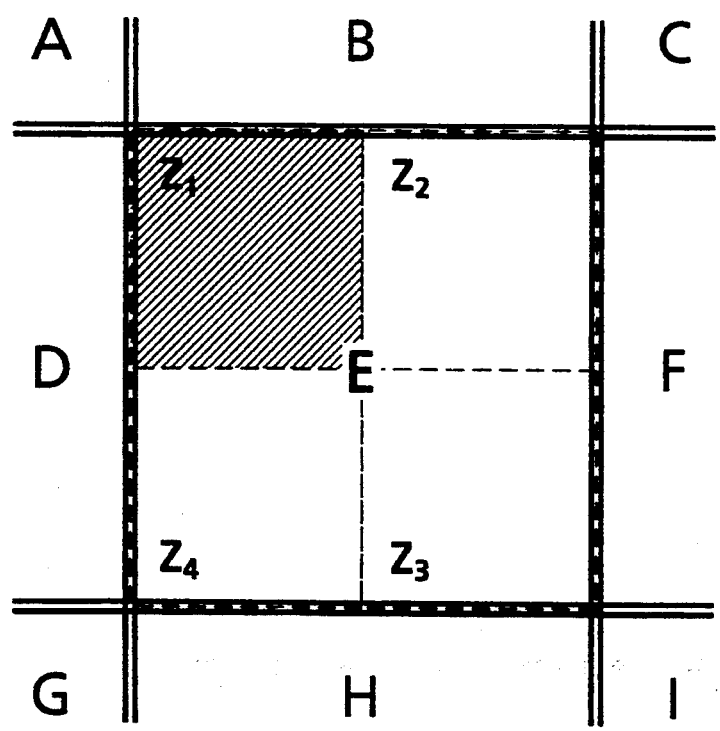
FIG. 2 is a detailed illustration of the 2× magnification method.

FIG. 2 depicts the center pixel E of FIG. 1, in an enlarged view with four magnified output pixels Z1, Z2, Z3, Z4 superimposed to represent the output of a 2× magnification operation. Determination of the binary state ($z_1$) of pixel $Z_1$ is made based on the binary state of original pixel E and the original surrounding pixels.

For 2× magnification, the binary state of symmetrically unique output pixel ($Z_1$) is made according to application of the following state determination rules in order:

For Z1:

If pixels (A,B,C,D,F) are white and pixels (E,G,H,I) are black;or if pixels (G,D,A,H,B) are white and pixels (E,I,F,C) are black;

if pixels (I,H,G,F,D) are black and pixels (E,C,B,A) are white; or if pixels (C,F,I,B,H) are black and (E,A,D,G) is white; make output pixel (Z1) white and begin processing Z2; or if pixel E is white and A or B or D is black; make output pixel (Z1) black; otherwise Z1=E.

For Z2:
If pixels (C,F,I,B,H) are black and pixels (E,A,D,G,) are white;or
if pixels (B,D,E,F,G,H,I) are white and pixels (A,C) are black; make output pixel (Z2) black;or
if pixels (A,B,C,D,F) are white and (E,G,H,I) is black; make output pixel (Z2) white; or
if pixel E is white and B is black; make output pixel (Z2) black, otherwise Z2=E.

For Z3:
If pixels (G,D,A,H,B) are white and pixels (E,I,F,C,) are black; make output pixel (Z3) white; or
if pixels (IHGFD) are black and pixels (ECBA) are white;or
if pixels (A,G) are black and (B,C,D,E,F,H,I) are white; make output pixel (Z3) black; or if pixel E is white and D is black; make output pixel (Z3) black, otherwise Z3=E.

For Z4:
If pixels (A,B,C,D,F) are black and pixels (E,G,H,I) are white;or
if pixels (I,H,G,F,D) are black and pixels (E,C,B,A) are white; or
if pixels (G,D,A,H,B) are black and pixels (E,A,D,G) are white; or
if pixels (C,F,I,B,H) are black and (E,A,D,G) are white; or
if pixels (B,D) are black and (E,I) are white and either (C,F) or (G,H) is white; or
if pixels (B,F) are black and (E,G) are white and either (H,I) or (A,D) is white; or
if pixels (D,H) are black and (E,C) is white and either (A,B) or (F,I)
is white; or
if pixels (F,H) are black and (E,A) is white and either (D,G) or (B,C)
is white; make output pixel (Z4) black; otherwise Z4=E.

The 2× magnification state determination rules, as described, are extensible to larger magnification levels.

Figure 3A:
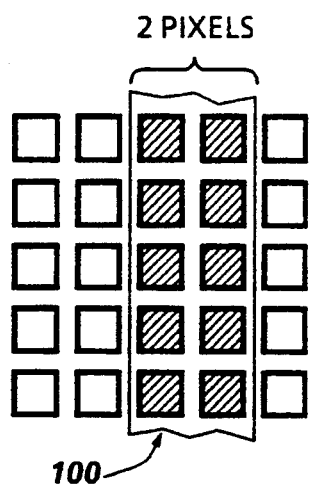
FIGS. 3A and 3B are respectively, an illustrative example of a portion of an input image and the resultant 2× magnification of the image represented by FIG. 3A in accordance with the present invention.
Figure 3B:
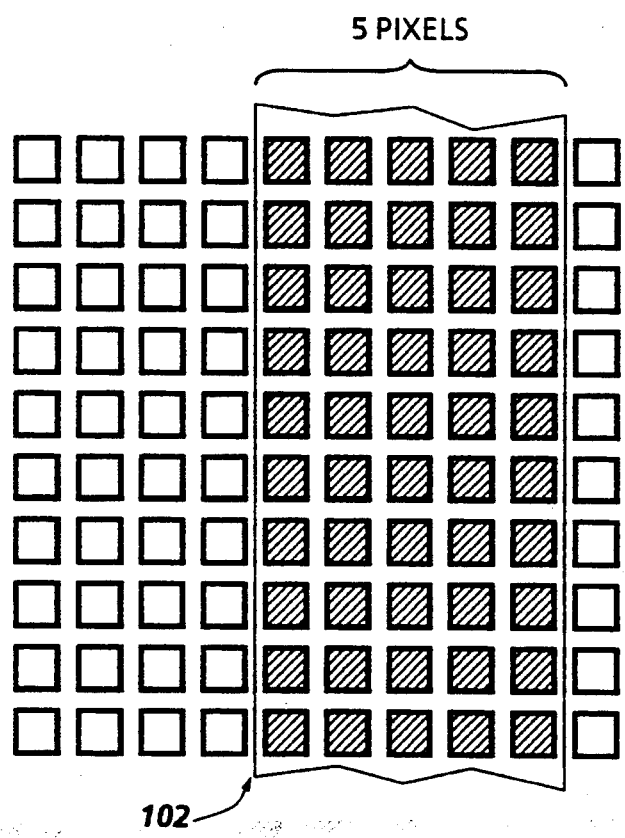

Referring now to FIGS. 3A and 3B which illustrate an example input image and output image respectively, FIG. 3A is intended to depict a representative portion 100 of an input image, possibly a thin vertical line extending beyond the edges of the sample. FIG. 3B depicts the resultant output image 102 after 2× magnification in accordance with the present invention. It will be noted that while a simple bit doubling routine commonly used for resolution conversion would have made the two pixel-thick line four pixels thick, the inventive resolution conversion process takes into account thinning noted in the printing of images optimized for write black processor to a write white process, and thickens the image by an additional pixel width. The bitmap thickness is increased by about 25%, at least a portion of which increase compensates for the line thinning noted in the write-white printing. While an image converted with a bit doubling process would tend to be washed out in appearance (because the printed lines are relatively thinner) the thickened lines resulting from the invention dilation process retain their dark appearance.

Figure 4A:
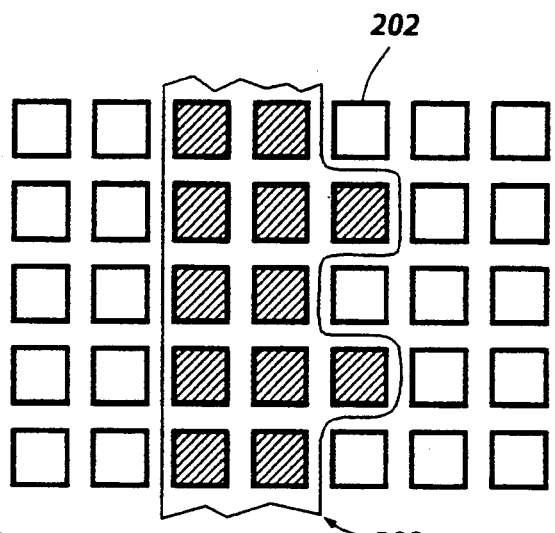
FIGS. 4A and 4B are another example of a portion of an input image and the resultant 2× magnification of the image represented by FIG. 4A in accordance with the present invention.
Figure 4B:
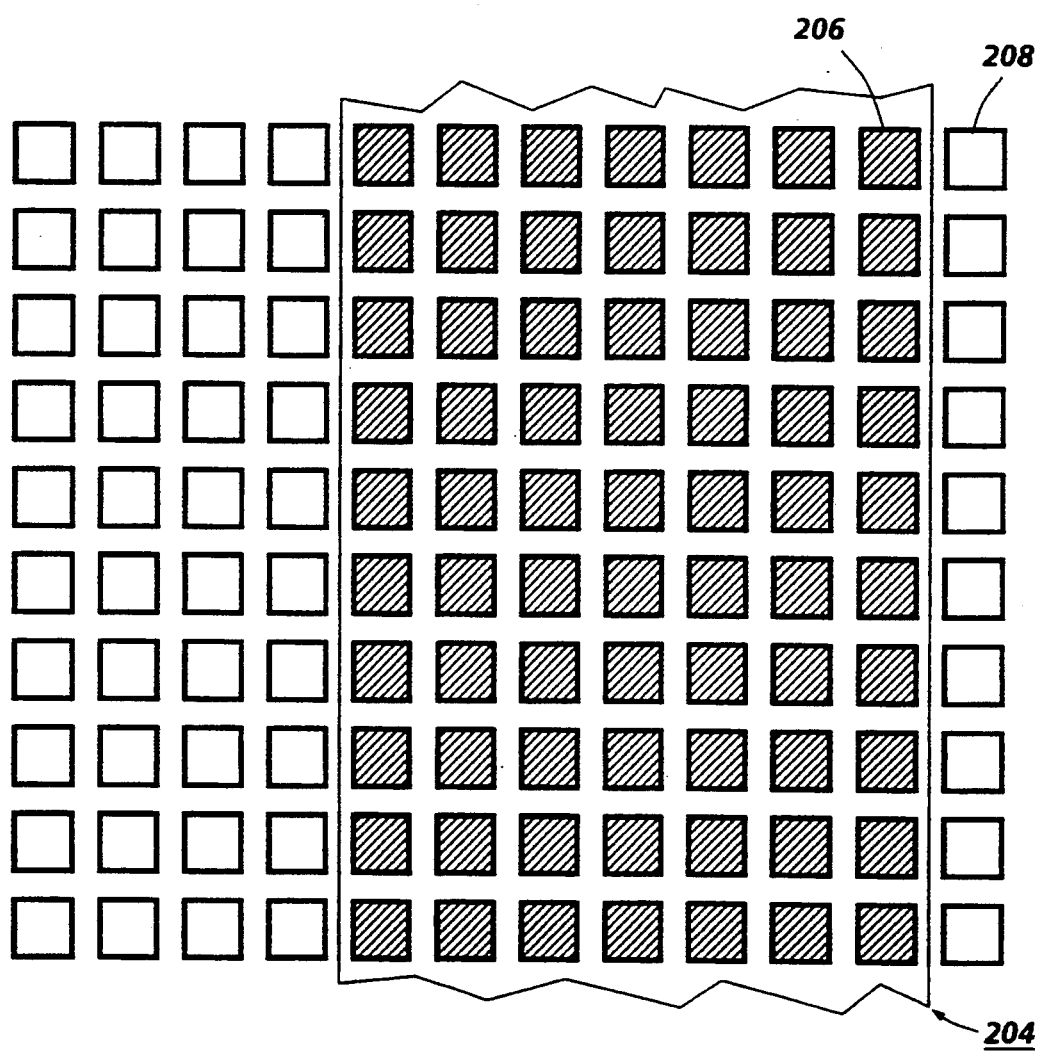

In FIG. 4A, line 200, illustrates a typical half-bitting effect (in column 202) of alternating black and white pixels, possibly caused by digital quantization of an edge in that area of the image. Half bitting is sometimes also used to cause a line to appear somewhat less than a single pixel width thicker. With higher resolution printing, halfbitting is not required. FIG. 4B depicts the resultant output line 204 after 2× magnification in accordance with the present invention. As seen in columns 206 and 208, the techniques used in the present invention enable smoothing of the half-bitting effects present in the original image to produce a visually acceptable high resolution image. The state determination rules for the 2× magnification were purposely designed to alter the binary state of pixels in close proximity to an edge in order to smooth the edge, thereby improving the visual perception of the edge when output at a higher resolution. Again, the thinning of the process is taken into account in the resolution conversions algorithm so that the image bitmap thickness is increased by approximately 40%, which increase compensates for the line thinning noted in the write-white printing.

Figure 5A:
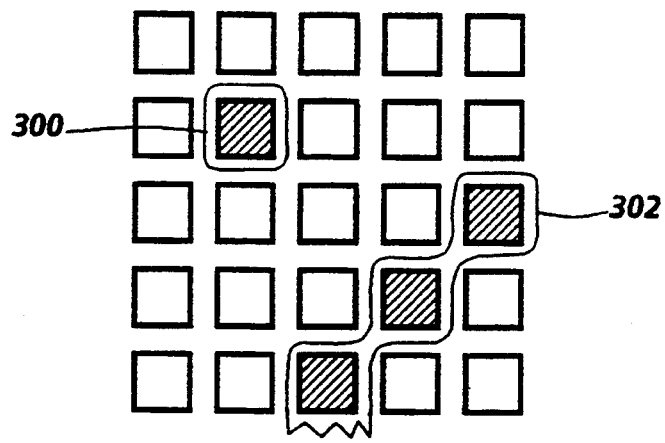
FIGS. 5A and 5B are another example of a portion of an input image and the resultant 2× magnification of the image represented by FIG. 5A in accordance with the present invention.
Figure 5B:
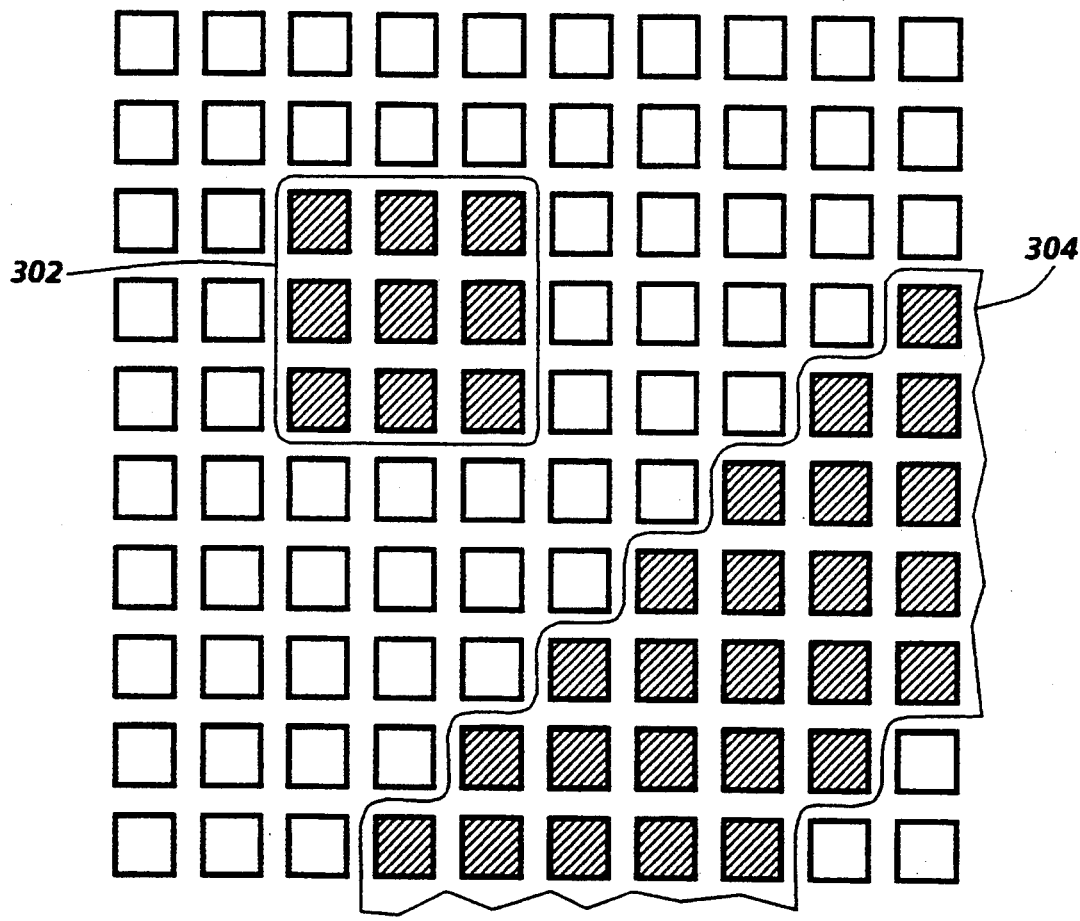

Refer now to FIGS. 5A and 5B, which illustrates an additional set of original and 2× magnification images. Specifically, FIG. 5A, illustrates an input image containing a single pixel 300 and a one pixel wide 45° line, represented by pixels 302. FIG. 5B illustrates the resultant 2× magnified image after processing in accordance with the present invention. The capability of the magnification technique to preserve single pixel structure is indicated by pixels 304 which represent the 2× magnification of pixel 60, which now has a bitmap size approximately 50% larger. Furthermore, FIG. 5b illustrates the resultant smoothed and thickened line, pixels 306 which are also a 2× magnification of the line in FIG. 5A, pixels 302.

Figure 6A:
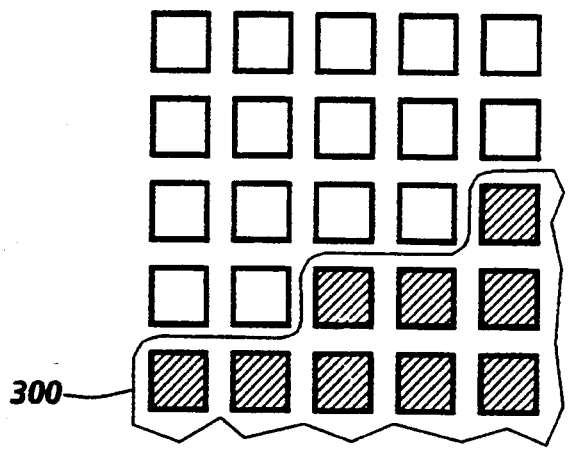
FIGS. 6A and 6B are yet another example of a portion of an input image and the resultant 2× magnification of the image represented by FIG. 6A in accordance with the present invention.
Figure 6B:
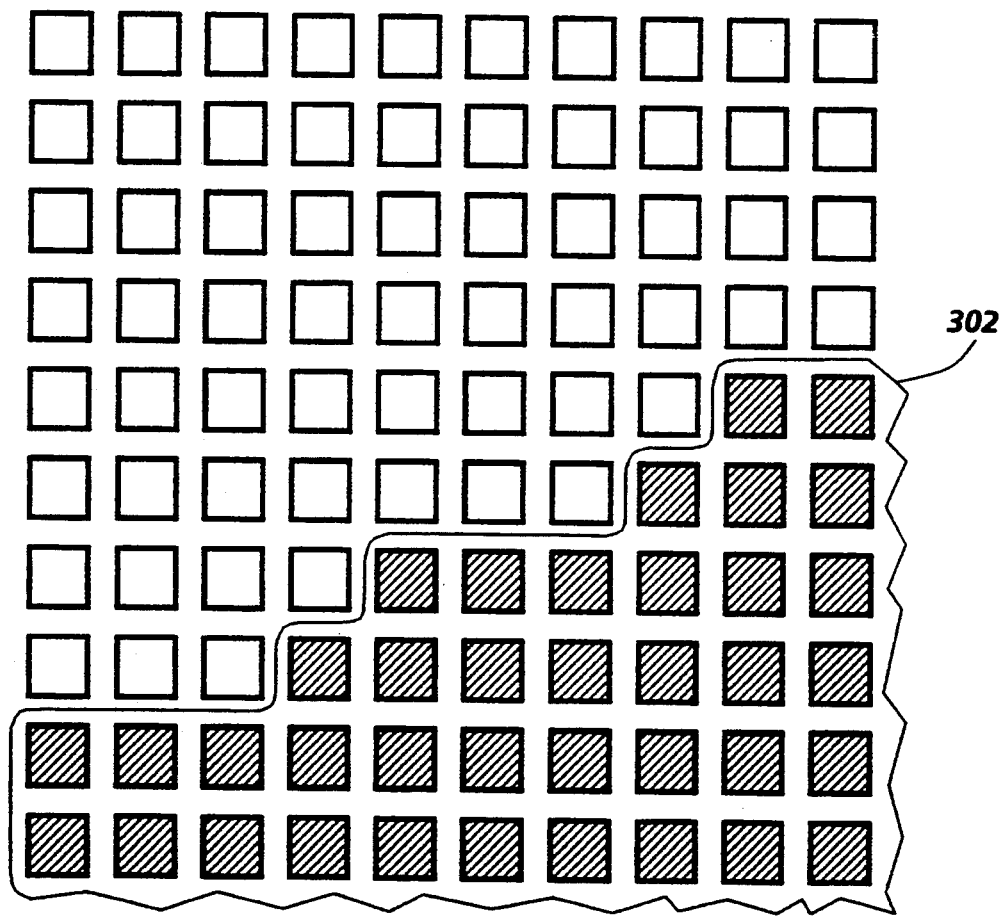

Finally, FIGS. 6A and 6B illustrate another example of the smoothing capabilities of the resolution conversion technique in accordance with the present invention. Shaded pixels 400 form an angled edge at the black to white transformation area. As described previously, resolution conversion of this type of an edge may result in the formation of "jaggies" along the edge. The jaggies are the direct result of the magnification of the inherent step type representation of an angled edge. While it is not possible to completely remove the jaggies from the higher resolution image, the visual impact of the jaggies is reduced to an acceptable level. Pixels 402 of FIG. 6B represent the converted output of the input image of FIG. 6A, using a conversion factor of 2×, in accordance with the present invention. The resultant steps seen in the black to white transition of FIG. 6B while perceptible at the size presented would be inherently less perceptible when produced at approximately one half of the present scale. In other words, if FIG. 6B had been produced at a 2× higher resolution, in a such a manner so as to maintain the same size of the original image area of FIG. 6A, the step height of the black to white edge would be one half of that evident in the original image, FIG. 6A. Again, thickening is also accomplished.

The capability of the resolution conversion technique as demonstrated in the above description and related figures is therefore apparent. Furthermore, the state determination rules may be tailored to meet the requirements of specific applications, thereby providing different capabilities as desired. Additionally, the 2× conversion example hereby presented should be understood to be extensible, using the same principles as described, to other integral levels of magnification. Finally, rotation of the rules by increments of 90° is well within the scope of the invention.

While there has been illustrated and described what is at present considered to be a preferred embodiment of the present invention, it will be appreciated that numerous changes and modifications are likely to occur to those skilled in the art, and it is intended to cover in the appended claims all those changes and modifications which fall within the true spirit and scope of the present invention.

I claim:

1. In a system for manipulating binary digital images represented by a plurality of original image pixels prepared for a first printer, the method of magnifying, by a predetermined magnification factor, the binary digital image pixels in two dimensions for printing at a second printer, including the steps of:

1) defining a magnified pixel array to represent the magnification of each original pixel for printing at a second printer;
  2) determining all symmetrically unique magnified pixel positions within said magnified pixel array;
  3) selecting an original image pixel (E) as a target pixel to be magnified for printing at a second printer;
  4) determining neighboring pixels A, B, C, D, F, G, H, I in a 3×3 array of pixels centered about the target pixel (E), respectively at positions (1,1), (1,2), (1,3), (2,1), (2,3) (3, 1), (3,2), (3,3) of the array having target pixel (E) at position (2,2) of the 3×3 array;
  5) subdividing said target pixel (E) into a 2×2 array of magnified image pixels, Z1, Z2, Z3, Z4, respectively at positions (1,1), (1,2), (2,2), (2,1) of the 2×2 array, where pixel Z 1 touches pixels A, B and D, and including the establishment of the set of symmetrically unique magnified pixel positions;
  6) for each of said symmetrically unique magnified pixels, Z1, Z2, Z3, Z4, assigning state determination rules to govern the determination of the pixel state for each symmetrically unique magnified pixel position, said state determination rules determined by a reproduction process of the second printer and given as follows:

For Z1:
    if pixels (A,B,C,D,F) are white and pixels (E,G,H,I) are black;or
    if pixels (G,D,A,H,B) are white and pixels (E,I,F,C) are black;
    if pixels (I,H,G,F,D) are black and pixels (E,C,B,A) are white; or
    if pixels (C,F,I,B,H) are black and (E,A,D,G) is white; make output pixel (Z1) white and begin processing Z2; or
    if pixel E is white and A or B or D is black; make output pixel (Z1) black;
    otherwise Z1=E;

For Z2:
    if pixels (C,F,I,B,H) are black and pixels (E,A,D,G,) are white;or
    if pixels (B,D,E,F,G,H,I) are white and pixels (A,C) are black; make output pixel (Z2) black;or
    if pixels (A,B,C,D,F) are white and (E,G,H,I) is black; make output pixel (Z2) white; or
    if pixel E is white and B is black; make output pixel (Z2) black, otherwise Z2=E.

For Z3:
    If pixels (G,D,A,H,B) are white and pixels (E,I,F,C,) are black; make output pixel (Z3) white; or
    if pixels (IHGFD) are black and pixels (ECBA) are white;or
    if pixels (A,G) are black and (B,C,D,E,F,H,I) are white; make output pixel (Z3) black; or
    if pixel E is white and D is black; make output pixel (Z3) black, otherwise Z3=E.

For Z4:
    If pixels (A,B,C,D,F) are black and pixels (E,G,H,I) are white;or
    if pixels (I,H,G,F,D) are black and pixels (E,C,B,A) are white; or
    if pixels (G,D,A,H,B) are black and pixels (E,A,D,G) are white; or
    if pixels (C,F,I,B,H) are black and (E,A,D,G) are white; or
    if pixels (B,D) are black and (E,I) are white and either (C,F) or (G,H) is white; or
    if pixels (B,F) are black and (E,G) are white and either (H,I) or (A,D) is white; or
    if pixels (D,H) are black and (E,C) is white and either (A,B) or (F,I) is white; or
    if pixels (F,H) are black and (E,A) is white and either (D,G) or (B,C) is white; make output pixel (Z4) black; otherwise Z4=E;

7) determining a black or white binary state for each of said magnified image pixels according to said state determination rules; and
  8) repeating steps 4 through 8 above until all original image pixels have been magnified.

2. In a system for manipulating binary digital images represented by a plurality of original image pixels, each pixel having one of two states defining the appearance thereon and prepared for a first printer, the method of magnifying, by a predetermined magnification factor, the binary digital image pixels in two dimensions, said magnification method additionally compensating for an anticipated output printer characteristics tending to slightly thin image features, including the steps of:

1) defining a magnified pixel array to represent the magnification of each original pixel for printing at the second printer;
  2) determining all symmetrically unique magnified pixel positions within said magnified pixel array;
  3) for each of said symmetrically unique magnified pixels, establishing a unique set of state determination rules for the magnified pixel array based on the state of said symmetrically unique magnified pixels and said original image pixels, said rules tending to favor defining a magnified pixel at a first state over defining a magnified pixel at a second state at portions of the original image having a state transition, whereby the image features defined by said first state pixel tend to be slightly enlarged with respect to image features defined by second state pixels at said image transition;
  4) selecting an original image pixel (E) as a target pixel to be magnified for printing at a second printer;
  5) determining neighboring pixels which are adjacent to the target pixel (E) in the image prepared for the first printer to establish an array of original image pixels inclusive of said target pixel;
  6) subdividing said target pixel (E) into an array of magnified image pixels, including the establishment of the set of symmetrically unique magnified pixel positions;
  7) determining a black or white binary state for each of said magnified image pixels according to said state determination rules; and
  8) repeating steps 4 through 8 above until all original image pixels have been magnified.

* * * * *